Dec. 23, 1941. G. F. VOIGHT 2,267,059
CUTTING AND SCRAPING TOOL
Filed Sept. 7, 1938
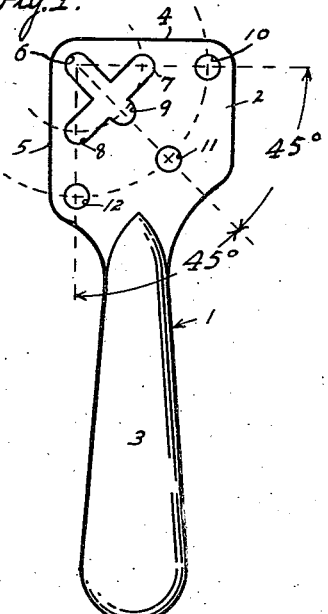
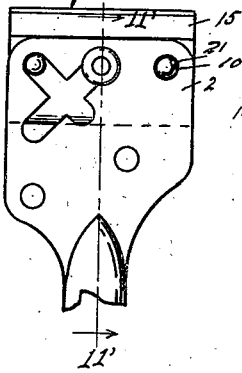
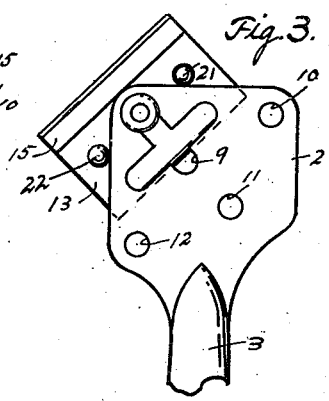
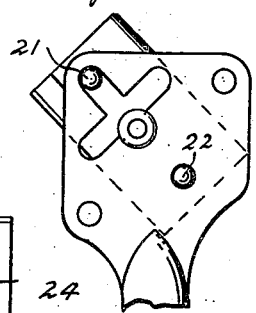
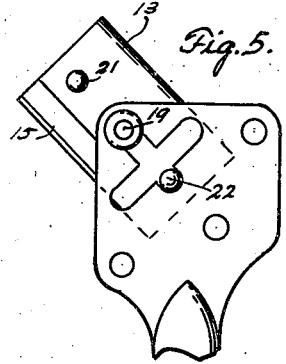
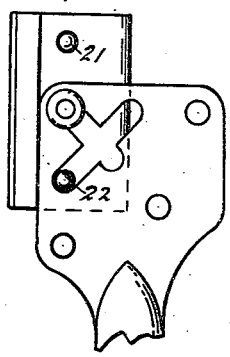
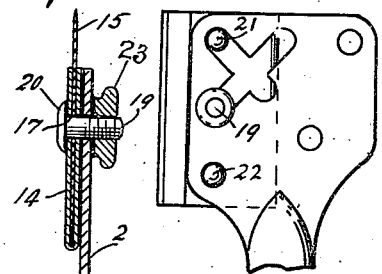
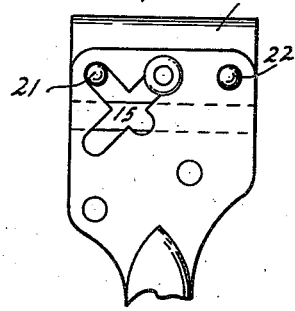
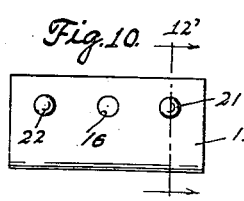
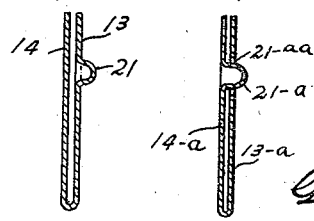
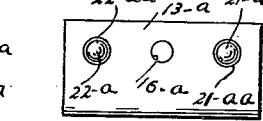
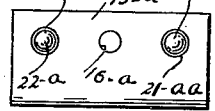
Inventor
George F. Voight Patented Dec. 23, 1941

2,267,059

UNITED STATES PATENT OFFICE 2,267,059

CUTTING AND SCRAPING TOOL

George F. Voight, Oakland, Calif.

Application September 7, 1938, Serial No. 228,775

7 Claims. (Cl. 30—320)

My invention relates to improvements in a cutting and scraping tool employing a safety-razor blade as the cutting and scraping element.

One of the objects of the invention is to provide a cutting and scraping tool comprising a principal tool portion and a blade assembly portion supported thereby and adjustable into various operable positions relative thereto.

Other objects and purposes will appear as the specification continues; it being understood that changes in the precise embodiment of the invention herein disclosed can be made within the scope of what is claimed without departing from the spirit of the invention.

In the accompanying drawing—

Figure 1 is a top view of the principal tool portion of the present invention;

Figure 2 is a top view of the front end portion thereof and the blade assembly secured thereto in forward operable position;

Figures 3 to 8, inclusive, are top views of the front end portion and the blade assembly secured thereto in various positions;

Figure 9 is a side view of the blade;

Figure 10 is an upper face view of the top plate forming a portion of the blade assembly;

Figure 11 is an enlarged vertical section on line 11'—11' of Fig. 2;

Figure 12 is an enlarged vertical section on line 12'—12' of Fig. 10;

Figures 13 and 14 are views of a slightly modified form of the blade assembly, and in which Fig. 13 is a top plan view and Fig. 14 a vertical section on line 14'—14' of Fig. 13. Further reference will be had to this modified form of the blade assembly as the description proceeds.

Describing the invention in stricter detail, in which reference will be had to the drawing by reference characters, and throughout which like reference characters will designate like parts:

In constructing the present invention there is provided a principal tool portion 1 comprising a flat front end plate portion 2 and a rear end or handle portion 3, the latter preferably concavo-convex in cross section.

The front marginal edge 4 of the front plate portion 2 extends at right angles to the side marginal edge 5 thereof, the latter edge 5 may at times be referred to as the left marginal edge.

The front portion 2 is provided with an opening comprising elongated branches or slots 6, 7 and 8, and a minor branch or notch 9, intersecting at right angles, and openings 10, 11 and 12 disposed in an arc of a circle of 90 degrees. The opening 11 is disposed equi-distant from the openings 10 and 12.

The free ends of the opening branches 6, 7, 8 and 9 are preferably in the form of arcs of circles.

The centers of curvature of the free ends of the branches 6 and 7 are disposed in alignment with the center of the opening 10 and equal distances therewith from the front edge 4 of the portion 2, and the centers of curvature of the free ends of the branches 6 and 8 are disposed in alignment with the center of the opening 12 and equal distances therewith from the edge 5.

The center of curvature of the minor branch 9 is approximately equi-distant from the center of the opening 11 and the center of curvature of the branch 6 and in alignment therewith.

Upper and lower binding plates 13, 14, respectively, which preferably are formed from a single rectangular piece of flat metal bent double (Figs. 10, 11 and 12), coact to form a holder, the two sides of which hold therebetween a blade 15.

The blade 15, which preferably is double-edged, may be any one of several conventional razor blades or the like.

The plates 13, 14 have openings 16, 17, respectively, in axial registration with the opening 18 in the blade 15, through which openings projects a binding screw 19 provided with a head 20 engaging the lower side of the plate 14.

The plates 13, 14, blade 15 disposed therebetween, and screw 19 projecting through said plates and blade, constitute the blade assembly of the present tool.

On the upper surface of the plate 13 and on opposite sides of the opening 16, are a pair of upstanding studs 21, 22.

The plate assembly is, as shown in Figs. 2 to 8, inclusive, movable into various positions with respect to the portion 2, thereby providing a tool useful for various purposes in which a cutting blade is required.

The blade assembly is secured to the lower face of the portion 2 by the screw 19 projected through a selected branch of the opening branches 6, 7, 8 and 9, and secured by the nut 23.

To further secure the assembly to the portion 2 in any of its operable positions and to prevent accidental rotative movement thereof about the axis of the screw 19, one of the studs 21, 22, may be disposed in one of the openings 10, 11, 12, and the other and coacting stud disposed in one of the opening branches 6, 7, 8, 9, as shown in Figs. 2, 4, 7 and 8. In Fig. 3 the studs 21, 22 are shown in engagement with the marginal edges 4 and 5, respectively, of the portion 2; while in Figs. 5 and 6 the stud 22 is shown disposed in the opening branches 9 and 8, respectively, and the coacting stud 21 disposed at a distance from the portion 2.

Fig. 8 shows the blade assembly disposed in safety position with the exposed portion of the blade 15 extending rearwards beneath the portion 2.

The blade assembly may be secured to the portion 2 in certain positions other than those shown, if desired, without changing the arrangement of any of the openings in said portion 2.

Obviously, the blade 15 may be reversed with respect to the plates 13, 14, whereby either of its cutting edges may be disposed into operable position a distance forwardly of the front edges of said plates.

The modification of the blade assembly shown in Figs. 13 and 14, resides in substituting locking studs 21—a, 22—a, secured to the lower plate 14—a, for the studs 21, 22 secured to the upper plate 13 of the preferred form thereof. Comparatively large openings 21—aa, 22—aa in the upper plate 13—a, permit the studs 21—a, 22—a to pass therethrough, which however first pass through openings 24, 25 in the blade 15. In all other respects the method of mounting the blade clamping means against the lower side of the member 2 is, in the modification shown in Figs. 13 and 14, identical with that described in connection with the embodiment of the invention shown in Figs. 1 to 8 inclusive.

I claim:

1. A tool of the character described comprising a handle, a plate carried by said handle, said plate having a straight front edge and a straight side edge disposed at right angles to said front edge, said plate having a slot therein extending in bisecting relationship to the angle subtended by said front and side edges of said plate, said slot having closed inner and outer ends and the outer end thereof being disposed in the corner portion of said plate between the said front and side edges thereof, said plate having a hole therein the center of which is spaced inwardly from the geometrical center of the inner closed end of said slot a distance equal to the spacing of the geometrical centers of the ends of said slot from each other, said hole being disposed in a prolongation of the longitudinal axis of said slot, said plate having a second and a third hole therein disposed equal distances to opposite sides of said first hole, respectively, and each having its center spaced the same distance as the center of said first hole from the geometrical center of the outer end of said slot, said second and third holes being disposed so that a straight line drawn through the center of one of them and through the geometrical center of the outer end of said slot is disposed at right angles to a straight line drawn through the center of the other of them and through the geometrical center of the outer end of said slot, said plate having a second slot therein opening at its inner end into said first mentioned slot and having a closed outer end, the geometrical center of which is disposed midway between the center of said second hole and the geometrical center of the outer end of said first mentioned slot and in a straight line passing through said centers, said plate having a third slot therein opening at its inner end into said first mentioned slot and having a closed outer end the geometrical center of which is disposed midway between the center of said third hole and the geometrical center of the outer end of said first mentioned slot and in a straight line passing through said latter centers, a blade holder disposed against one face of said plate, a bolt and nut clamping said blade holder against said plate, said bolt extending through said holder and one of said slots and being shiftable therefrom into any other of said slots, and a pair of studs on said holder disposed in a straight line passing through their centers and the center of said bolt and spaced equal distances to opposite sides of said bolt corresponding to the spacing of the geometrical centers of the outer ends of the second and third slots from the geometrical center of the outer end of said first slot and from the centers of the second and third holes, respectively, for selective disposition in the ends of said slots and said holes to hold the blade holder in various different positions of adjustment relative to said plate.

2. A tool of the character described comprising a handle, a plate carried by said handle, said plate having a first slot therein having closed inner and outer ends and further having a first hole therein the center of which is spaced inwardly from the geometrical center of the inner end of said slot a distance equal to the spacing of the geometrical centers of the ends of said slot from each other, said hole being disposed in a prolongation of the longitudinal axis of said slot, said plate having a second and a third hole therein disposed equal distances to opposite sides of said first hole, respectively, and each having its center spaced the same distance as the center of said first hole from the geometrical center of the outer end of said slot, said second and third holes being disposed so that a straight line drawn through one of them and through the geometrical center of the outer end of said slot is disposed at substantially right angles to a straight line drawn through the center of the other of them and through the geometrical center of the outer end of said slot, said plate having a second slot therein opening at its inner end into said first mentioned slot and having a closed outer end the geometrical center of which is disposed midway between the center of said second hole and the geometrical center of the outer end of said first mentioned slot and in a straight line passing through said centers, said plate having a third slot therein opening at its inner end into said first mentioned slot and having a closed outer end the geometrical center of which is disposed midway between the center of said third hole and the geometrical center of the outer end of said first mentioned slot and in a straight line passing through said latter centers, a blade holder disposed against one face of said plate, a bolt and nut clamping said blade holder against said plate, said bolt extending through said holder and one of said slots and being shiftable therefrom into any other of said slots, and a pair of studs on said holder disposed in a straight line passing through their centers and the center of said bolt and spaced equal distances to opposite sides of said bolt corresponding to the spacing of the geometrical centers of the outer ends of the second and third slots from the geometrical center of the outer end of said first slot and from the centers of the second and third holes, respectively, for selective disposition in the ends of said slots and said holes to hold the blade holder in various different positions of adjustment relative to said plate.

3. A tool of the character described comprising a handle, a plate carried by said handle, said plate having a straight front edge and a straight side edge disposed at right angles to said front edge, said plate having a slot therein extending in bisecting relationship to the angle subtended by said front and side edges, the outer end of said slot being closed and being disposed in the corner portion of said plate between the said front and side edges thereof, said plate having a pair of holes therein the centers of which are located equal distances from the geometrical center of the closed outer end of said slot, the center of one of said holes being spaced the same distance from the front edge of said plate as the geometrical center of the outer end of said slot, the center of the other hole being spaced the same distance from the said side edge of said plate as the geometrical center of the outer end of said slot, said plate having a second slot therein opening at its inner end into said first mentioned slot and having a closed outer end the geometrical center of which is located midway between and in a straight line passing through the geometrical center of the outer end of said first mentioned slot and the center of said first mentioned opening, said plate having a third slot therein opening at its inner end into said first mentioned slot and having a closed outer end the geometrical center of which is located midway between and in a straight line passing through the geometrical center of the outer end of said first mentioned slot and the center of said second mentioned opening, a blade holder disposed against one face of said plate, means including a screw element clamping said blade holder against said plate, said screw element extending through said holder and one of said slots and being shiftable therefrom into either of the other of said slots, and a pair of studs on said holder disposed in a straight line passing through their centers and the center of said screw element and spaced equal distances to opposite sides of said screw element, the centers of said studs being spaced from each other corresponding to the spacing of the geometrical center of the outer end of said first mentioned slot from the centers of the holes in said plate, for selective disposition in the ends of said slots and said holes to hold the blade holder in various different positions of adjustment relative to said plate.

4. A tool as set forth in claim 3 in which the inward disposition of the outer end of the first mentioned slot from the front edge and the mentioned side edge of the plate and the spacing of the blade holder studs from the screw element are such that said studs engage the front edge and the mentioned side edge of the plate when the screw element is disposed in the outer end of the first mentioned slot and the blade holder is disposed diagonally relative to the plate at substantially right angles to said first mentioned slot.

5. A tool of the character described comprising a handle, a plate carried by said handle, said plate having a first slot therein having a closed outer end, said plate having a second slot therein communicating at its inner end with said first mentioned slot and having a closed outer end disposed to one side of said first slot, said plate having a third slot therein communicating at its inner end with said first mentioned slot and having a closed outer end disposed to the other side of said first mentioned slot, said plate having a first hole therein the center of which is disposed in a straight line passing through the geometrical centers of the outer ends of said first and second slots, said plate having a second hole therein the center of which is disposed in a straight line at right angles to said first mentioned straight line and passing through the geometrical centers of the outer ends of said first and third slots, the centers of said holes being spaced the same distances from the geometrical centers of the outer ends of said second and third slots, respectively, as the geometrical centers of the outer ends of said second and third slots are spaced from the geometrical center of the outer end of said first slot, a blade holder disposed against one face of said plate, means including a screw element clamping said blade holder against said plate, said screw element extending through said holder and one of said slots and being shiftable therefrom into either of the other of said slots, and a pair of studs on said holder disposed in a straight line passing through their centers and the center of said screw element and spaced equal distances to opposite sides of said screw element, the centers of said studs being spaced from each other corresponding to the spacing of the geometrical center of the outer end of the first slot from the centers of said holes so that said screw element and said studs are selectively engageable in the outer ends of said slots and said holes to hold the blade holder in various different positions of adjustment relative to said plate.

6. A tool as set forth in claim 5 in which the plate is provided with a third hole located midway between the first and second holes and spaced the same distance from the outer end of the first slot as the first and second holes.

7. A tool as set forth in claim 5 in which the plate is provided with a third hole located midway between the first and second holes and spaced the same distance from the outer end of the first slot as the first and second holes, and in which the geometrical center of the inner end of the first slot is disposed midway between and in a straight line passing through the geometrical center of the outer end thereof and the center of said third hole.

GEORGE F. VOIGHT.